July 17, 1928. 1,677,470
M. E. DORSCH ET AL
ANIMAL TRAP
Original Filed Feb. 12, 1926  2 Sheets-Sheet 1
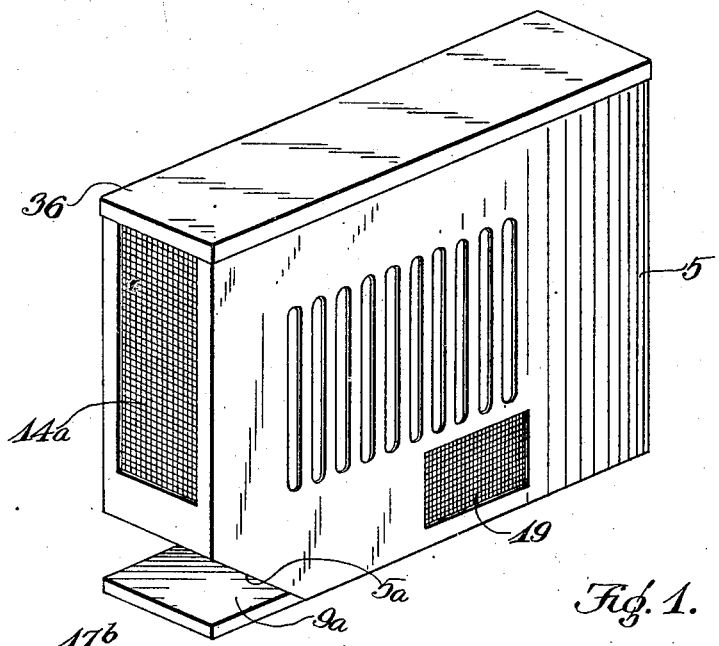
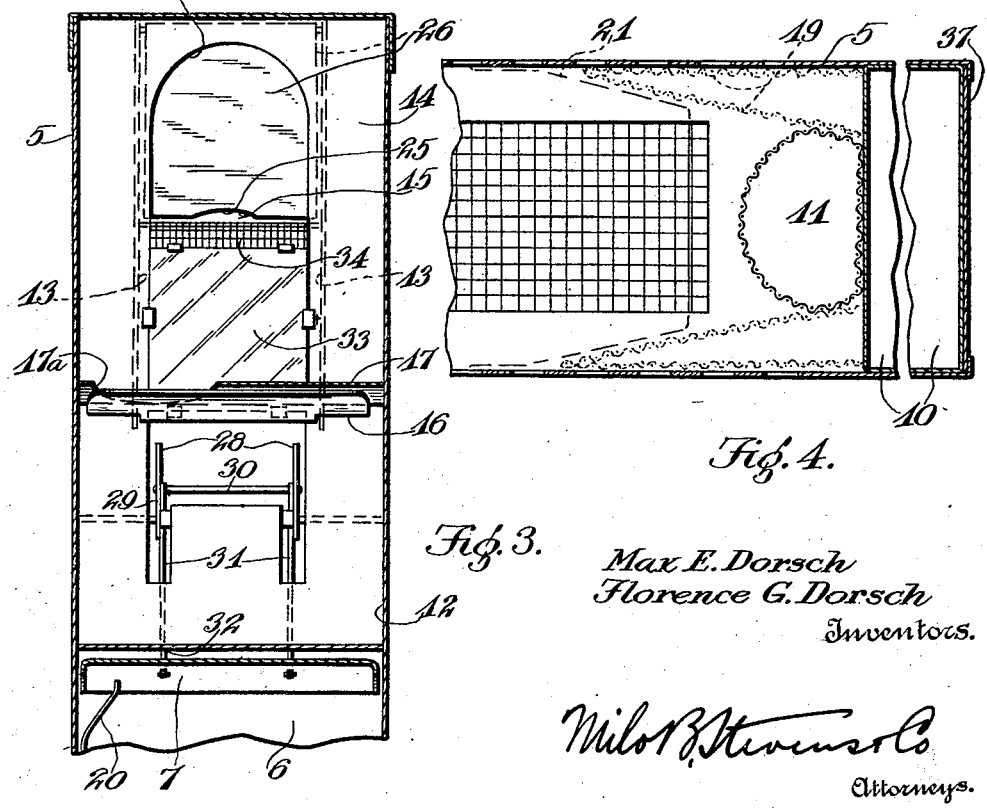
Max E. Dorsch
Florence G. Dorsch
Inventors.

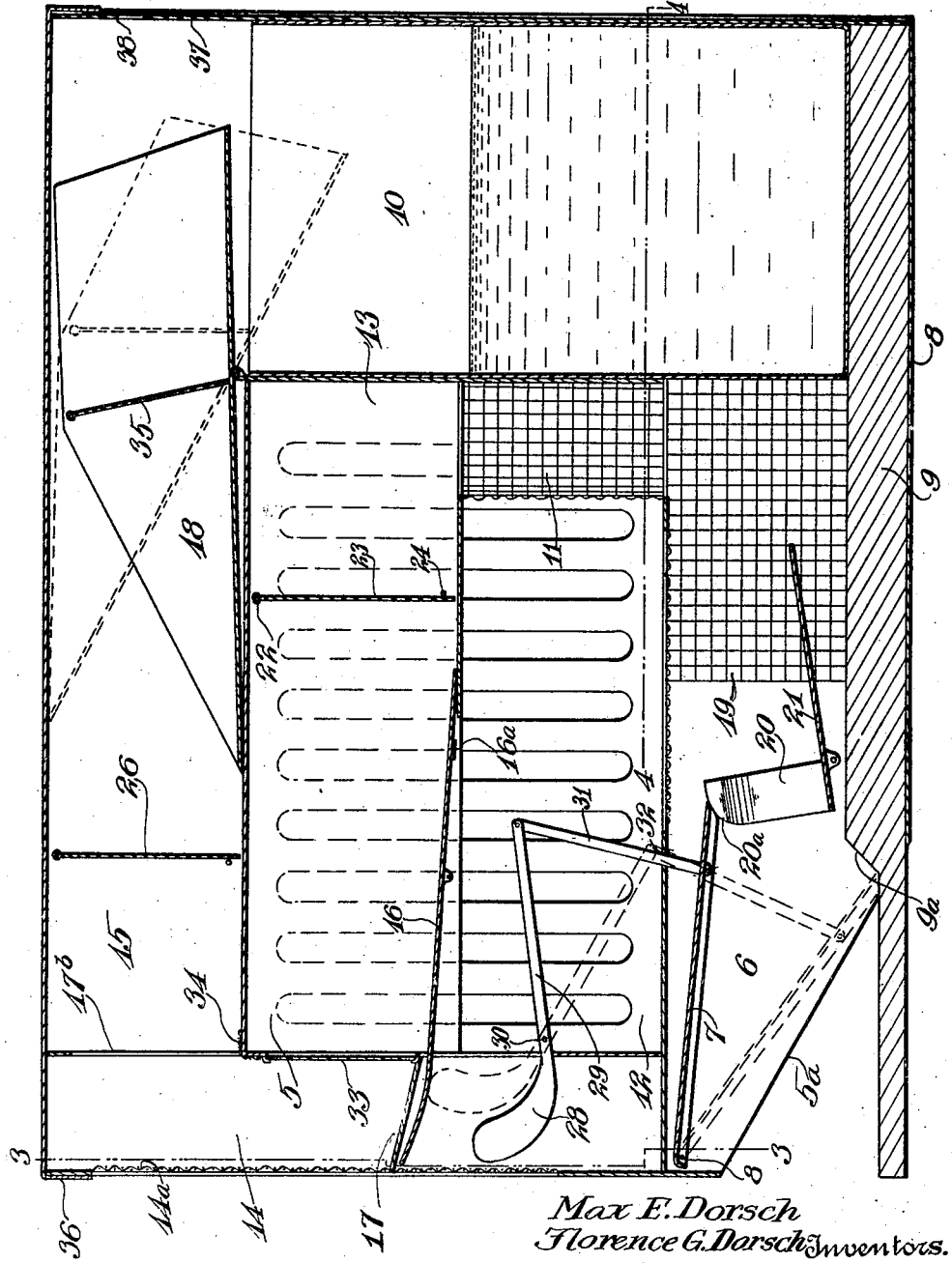

Patented July 17, 1928.

1,677,470

UNITED STATES PATENT OFFICE.

MAX E. DORSCH AND FLORENCE G. DORSCH, OF CHICAGO, ILLINOIS.

ANIMAL TRAP.

Application filed February 12, 1926, Serial No. 87,885. Renewed December 14, 1927.

Our invention relates to animal traps and particularly to such as are adapted for catching rodents, it being of the type characterized by a casing which is provided with a water receptacle and a superposed tiltable member or equivalent through which the animal is precipitated into the water and drowned.

The invention has among other objects to provide a trap of this character having an improved mechanism whereby an entry door will be automatically opened and the trap re-set upon the actuation of an intermediate false floor member on the way to the tiltable platform which drops the first entrapped animal into the water, the entire mechanism being encased within the trap yet readily accessible for inspection or repair. Also, the invention aims to furnish a trap of this kind whose entrance opening is accessible from the sides as well as from the front, so that placing the appliance next to a wall or object will not cut off access to its interior. Further, the invention contemplates a trap which will be relatively simple in its construction, inexpensive of manufacture, and efficient in operation.

Various other objects of the invention will be developed in the following descriptive matter and fully understood by reference to the accompanying drawings in which:—

Figure 1 is a perspective view of the novel animal trap;

Fig. 2 is a vertical longitudinal sectional view taken through the same;

Fig. 3 is a section on the line 3—3 of Figure 2; and

Fig. 4 a section on the line 4—4 of Figure 2, partly cut away.

Referring specifically to the drawings, the trap comprises a body portion 5 provided with an entrance chamber 6 at the bottom, which is adapted to be closed by means of a door 7, this door being hung from a pin 8 carried by the walls of the chamber at the front of the trap. These walls are of sheet metal and erected upon a base sheet 8 reinforced by a floor board 9 of wood or other suitable material. To provide clearance for the swinging of the door 7, as well as greater entrance space, the frontal section of the floor board 9 is cut with a drop 9ª.

The entrance chamber 6 extends well toward the rear of the trap and terminates in front of a tall tank 10, which contains water and is intended to receive the animal after it has passed through the compartments in the trap.

Above the entrance chamber 6 are arranged a short vertical shaft 11, a mechanism compartment 12, a passageway 13, a long vertical shaft 14, and a top chamber 15. It is intended that the animal proceed toward the rear end of the entrance chamber 6, where connection will be found with the shaft 11. The wall of the latter is reticulated and since the upper end of the shaft connects with the passage-way 13, the animal may climb in the shaft and enter the passage-way. Proceeding toward the front of the latter, the animal steps upon and tilts a platform 16, whose front end in dropping exposes opening 17ª in a cross partition and establishes communication between the passageway and the shaft 14. The front wall of the latter is also reticulated, as indicated at 14ª, whereby the animal may with facility climb to the top of the shaft where an opening in partition 17ᵇ lends the shaft connection with the top chamber 15. Here the latter opens upon the tiltable platform previously referred to—marked 18—which is over-balanced by the progress of the animal to a position leading into the tank, as denoted by dotted lines in Figure 2.

It will be noted that the side walls of the trap are cut away adjacent to the entrance as indicated at 5ª to make the entrance chamber accessible both from the front and from the sides. Thus, the trap may be placed in the corner of a room or next to a wall, a cupboard or a trunk so as to be out of the way and yet remain open to animals it is intended to exterminate. To attract such animals, a bait chamber 19 is provided. This is of wire netting and in the form of an M or double pocket as seen in plan view, and is set in the rear of the entrance chamber to open on the tank 10. Thus, as the tank is backed out of the trap, access is had to the bait chamber 19 for filling or changing of bait. As noted, the side walls of the trap are cut out opposite the bait chamber to expose the outer walls of the latter and therefore enable the bait to be scented and seen.

In order that the trap may function effectively, several trapping appliances are involved, whereby to check the animal's attempts to retreat, during its course through the sections of the trap. The first trapping device is in connection with the entrance door 7. This door is necessarily open when the trap is not in operation, to permit the entrance of the animal. The door is held open by resting on a prop-plate 20 forming a lateral bend of a tiltable platform 21 disposed near the floor of the entrance chamber 6. The frontal edge of the plate 20 is rounded, as indicated at 20ª, so that when the weight of the animal causes the platform to tilt toward the rear, the door 7 will lose its rear support and drop to closed position, as denoted by dotted lines in Figure 2.

As the retreat is now cut off, the animal proceeds as previously outlined, into the passageway 13 where is hung on a cross pin 22 a trap door 23. This door is free to swing forward, but one or more wall studs 24 prevent it from being moved rearwardly. As indicated at 25 in connection with a similar trap door 26 shown in Figure 3, the trap door 23 is slightly recessed at the bottom to admit light and thus invite the animal onward. The door 23 is thus pushed up by the animal on its way through, but immediately drops and is backed by the studs 24 to prevent retreat.

Beyond the trap door 23 the passage-way 13 is made with a false floor in the form of the tiltable platform 16 previously referred to, weighted at the rear as indicated at 16ª. As this platform tilts in forward direction from the weight of the animal it is intended to bear down upon the heels 28 of two laterally spaced arms 29 jointly fulcrumed on a cross pin 30, in the mechanism compartment 12. The arms extend beyond the fulcrum toward the rear where their ends make a loose pivotal connection with a pair of links 31. The latter drop through slots 32 in the floor of the mechanism compartment to make a loose pivotal connection with the door 7. It will thus be seen that when the weight of the animal rocks the platform 16 the door 7 is drawn open; and as the prop-plate 20 has dropped to normal position after the platform 21 was relieved of the animal's weight, the rise of the door to open position momentarily jolts the prop-plate to clear the same and eventually rest on top of it again. The entrance is now open for the next animal.

It will be noted that the front portion of the platform 16 ordinarily lies beneath the partition 17, which is fixed across the shaft 14. As mentioned before, the front end of the passage-way 13 is normally closed, but a glazed window 33 is fitted in such front end to supply light to the passage-way, and therefore lure the animal to the front so as to cause its weight to tilt the platform 16. The partition 17 is cut with the large opening 17ª at one side, which is seen by the animal as a direct passage to the shaft 14. The object of the restriction formed by the partition 17 is to assure the crowding of the animal at the front end of the platform 16 so as to fully depress the latter and cause the entrance door 7 to be lifted open, as explained before.

The threshold of the top chamber 15 is covered with a strip 34 of wire netting to assist the animal in climbing from the shaft 14 into said chamber. A hanging trap-door 26—similar to the trap-door 23 previously referred to—is provided in the top chamber to precede the platform 18; and a similar trap door 35 is hung in the platform 18. The object of the repeated provision of the trap doors is of course to induce the progress of the animal and thus offer the next entrant room to advance and in turn become barred from retreat.

It will thus been seen that a trap is herein provided which is entirely self-contained, has a plurality of safeguards against escape, automatically opens by the progress of one animal for the admission of the next, is open for access both from the sides and front, and employs no bolts, springs or other parts which are subject to disorder.

The top of the trap may be opened for inspection and repair by removing a firmly fitted cover 36. Also, the opening of the cover permits a removable backing plate 37 to be slid up and out, to enable the water tank to be backed out for emptying or refilling. The plate 37 may be cut with one or more light openings 38 to lure the animal onto the rear part of the platform 18.

We claim:—

1. An animal trap comprising a casing containing an entrance chamber, a door in the latter, an animal-actuated trip device to close said door, an elevated passageway communicating with the entrance chamber, animal-actuated means operable in said passageway to open said door, a restricted-passage partition to assure the operation of said means before the animal can proceed, a top chamber, a water tank at the end of the latter, and a tiltable platform in the top chamber leading into the tank.

2. An animal trap having an entrance chamber and a communicating passageway, a tiltable platform in said passageway, a door for said entrance chamber, an animal actuated trip device for holding said door against closing, said trap having an elevated chamber, a transverse opening in the floor of said elevated chamber, the end of said platform normally bearing against said floor to close said opening, door opening means controlled by the tilting of said platform a predetermined distance, and the position of said floor opening relative to said platform and one wall of said passageway being such as to assure tilting of the platform the requisite distance to open and re-set the door before the opening will be sufficiently exposed to admit the body of the animal.

3. In an animal trap having an entrance chamber and a communicating passageway, a door for said entrance chamber, a tiltable platform in said passageway a rockable member swung by the titlting of said platform, a link connection between the rockable member and the door to raise the same to open position as the rockable member swings, and a restricted passage partition to assure the requisite tilting of said platform to open the door before the animal can proceed.

4. In an animal trap having an entrance chamber and a communicating passageway, a door for said entrance chamber, animal actuated means operable in said passageway to open said door, said passageway having a restricted outlet adjacent said animal actuated means and said outlet being so positioned with respect to said animal actuated means as to assure the operation of the latter by the animal in forcing himself through said passageway.

In testimony whereof we affix our signatures.

MAX E. DORSCH.
FLORENCE G. DORSCH.